(12) United States Patent
Bellairs

(10) Patent No.: US 10,456,647 B1
(45) Date of Patent: *Oct. 29, 2019

(54) BASKETBALL SHOOTING TRAINING DEVICE

(71) Applicant: OnlyNet LLC, Richmond, VA (US)

(72) Inventor: Wesley Barth Bellairs, Georgetown, KY (US)

(73) Assignee: OnlyNet LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/276,991

(22) Filed: Feb. 15, 2019

Related U.S. Application Data

(63) Continuation of application No. 16/131,100, filed on Sep. 14, 2018, now Pat. No. 10,245,492.

(51) Int. Cl.
*A63B 69/00* (2006.01)
*A63B 71/00* (2006.01)
*A63B 71/06* (2006.01)

(52) U.S. Cl.
CPC ...... *A63B 69/0071* (2013.01); *A63B 69/0059* (2013.01); *A63B 69/00* (2013.01); *A63B 71/00* (2013.01); *A63B 2071/0625* (2013.01); *A63B 2209/10* (2013.01); *A63B 2243/0037* (2013.01)

(58) Field of Classification Search
CPC ............ A63B 69/00; A63B 2243/0037; A63B 69/0071; A63B 69/0059; A63B 2209/10; A63B 71/00
USPC ........................ 473/450, 448, 447, FOR. 101
See application file for complete search history.

(56) References Cited

U.S. PATENT DOCUMENTS

| 5,255,167 | A | * | 10/1993 | Toussaint | F21L 4/06 359/354 |
| 5,837,990 | A | * | 11/1998 | Shepard | G06K 7/10891 235/383 |
| 7,771,293 | B1 | * | 8/2010 | Vann | A63B 69/0071 473/422 |
| 10,245,492 | B1 | * | 4/2019 | Bellairs | A63B 69/0071 |
| 2007/0219025 | A1 | * | 9/2007 | Aberton | A63B 24/0003 473/450 |
| 2009/0042674 | A1 | * | 2/2009 | Shelton | A63B 69/0071 473/450 |

* cited by examiner

*Primary Examiner* — Benjamin Layno
(74) *Attorney, Agent, or Firm* — Williams Mullen; Thomas F. Bergert

(57) ABSTRACT

A basketball shooting training device employs a housing for retaining an optical projection device and one or more straps for facilitating a secure connection to the user. In various embodiments, the optical projection device is configured to emit a light beam, which facilitates prompt and accurate feedback for a user employing the device.

19 Claims, 3 Drawing Sheets

FIG. 4
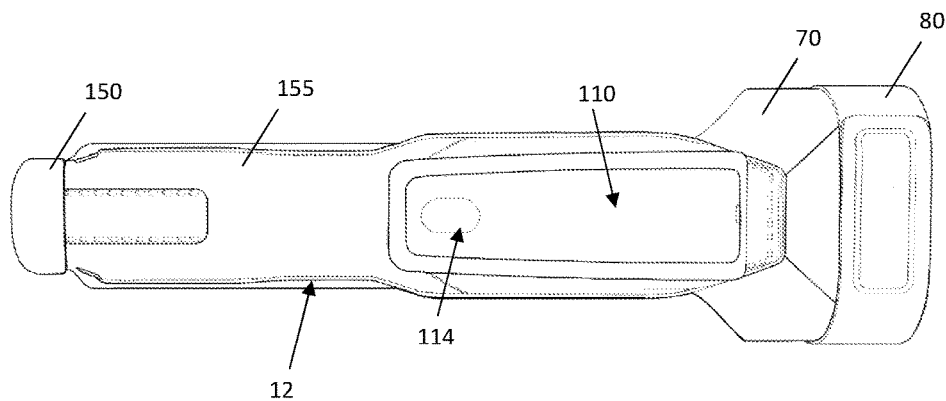
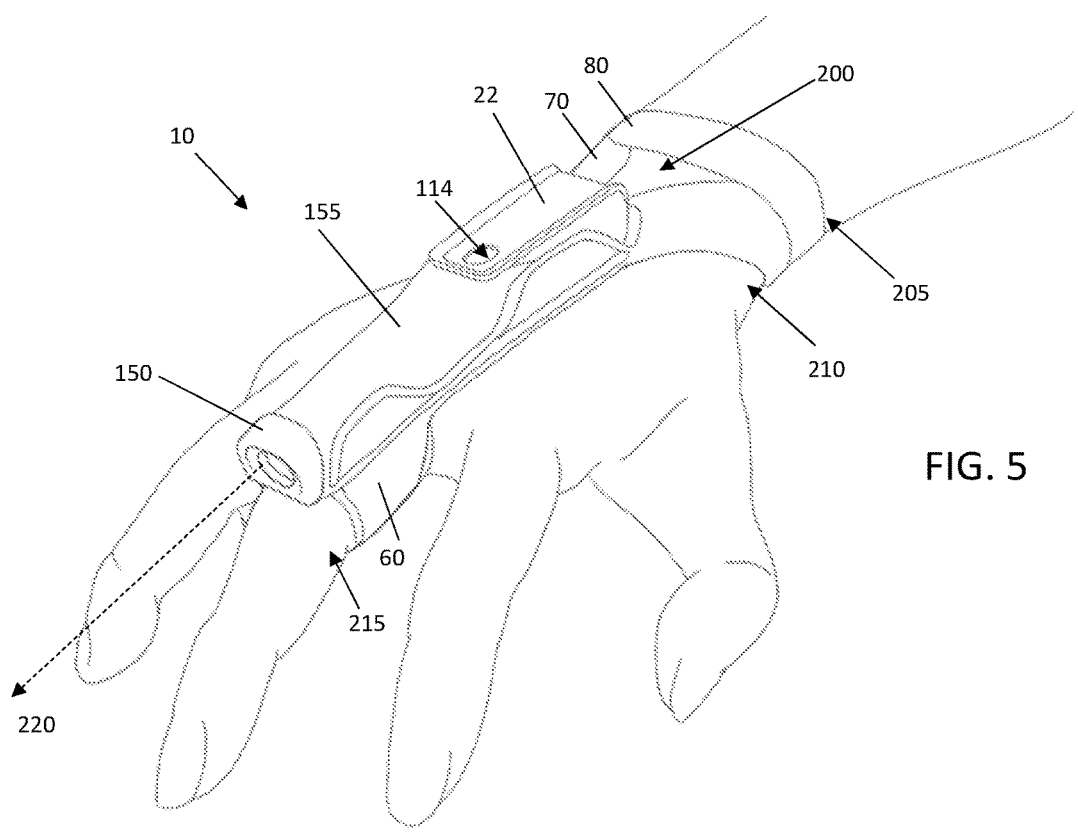
FIG. 5

BASKETBALL SHOOTING TRAINING DEVICE

CROSS-REFERENCE TO RELATED APPLICATIONS

This application is a continuation of U.S. application Ser. No. 16/131,100, filed on Sep. 14, 2018 now U.S. Pat. No. 10,245,492.

TECHNICAL FIELD

The present disclosure relates to training devices, and more particularly to a basketball shooting training device.

BACKGROUND

Proper training is essential for success in athletics. In basketball, for example, a player's offensive prowess is determined, in part, by the player's ability to consistently score by shooting a basketball through a basketball goal. While scoring can occur through layups and slam dunks, scoring frequently occurs through jump shots and free throws. Players with a properly trained and repeatable shooting form are far more likely to succeed in consistently scoring points than those with improper form. While shooting styles and training may vary somewhat from trainer to trainer, most agree that proper hand and arm alignment, as well as proper follow through, are essential to proper basketball shooting form.

SUMMARY OF THE DISCLOSURE

The present disclosure provides, in part, a basketball shooting training device that helps players improve the fundamental motion and positional mechanics associated with shooting a basketball. Embodiments of the device help users improve shooting mechanics by giving the user instant feedback on whether or not they are performing the motions correctly. The device is a powerful training tool for getting the basics and eliminating bad habits. In various embodiments, the device employs a housing for retaining an optical projection device and one or more straps for facilitating a secure connection to the user. The presently disclosed device works effectively regardless of whether the user is employing an actual basketball and/or training with an actual basketball goal. For instance, the user can practice proper form using the device disclosed herein at home and other environments away from a basketball court. Further, no basketball or other external device is required to operate the device disclosed herein and receive the associated training benefits.

BRIEF DESCRIPTION OF THE DRAWINGS

FIG. 4 is a top plan view of the device of FIG. 2.

FIG. 5 is a perspective view of the device of FIG. 2 in position and secured to a user.

DETAILED DESCRIPTION OF EMBODIMENTS

Figure 1:
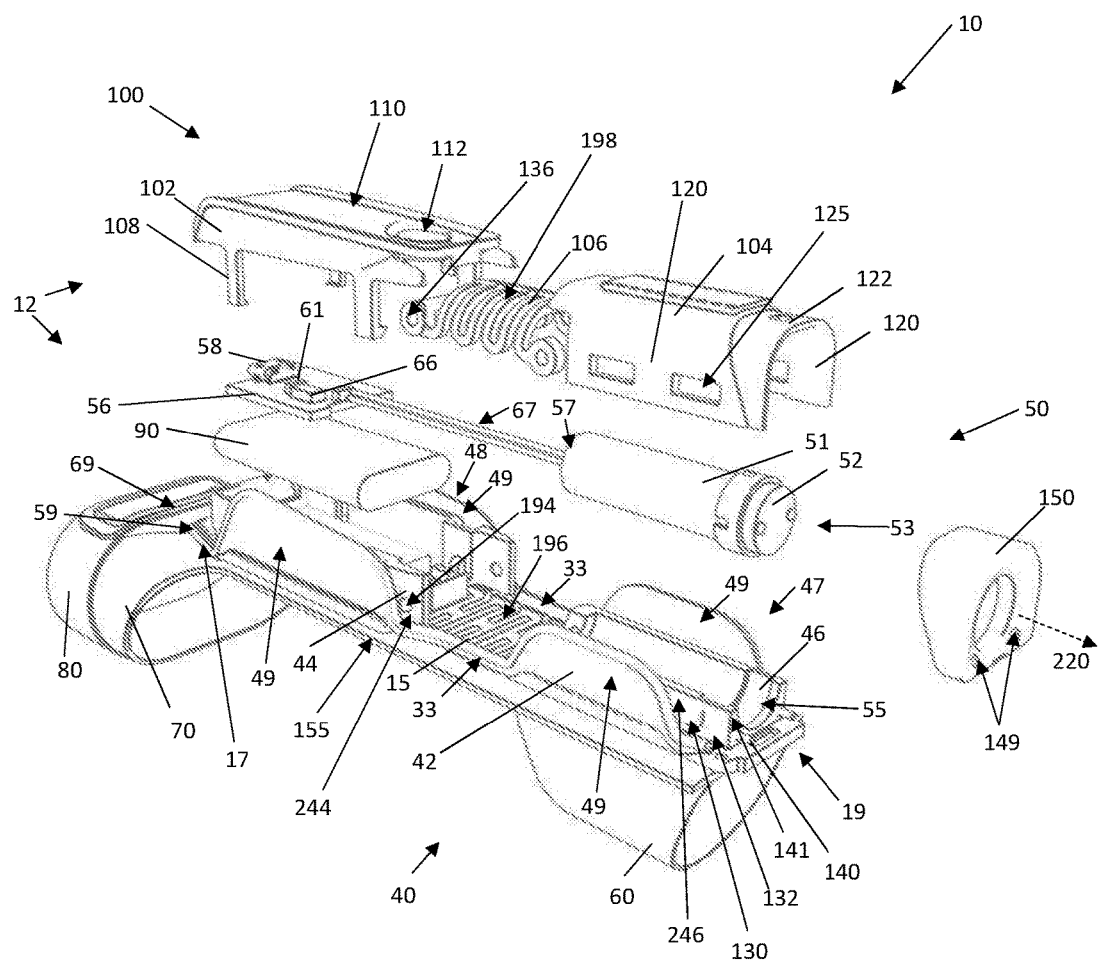
FIG. 1 is an exploded front perspective view of one embodiment of a basketball shooting training device in accordance with the present disclosure.
Figure 2:
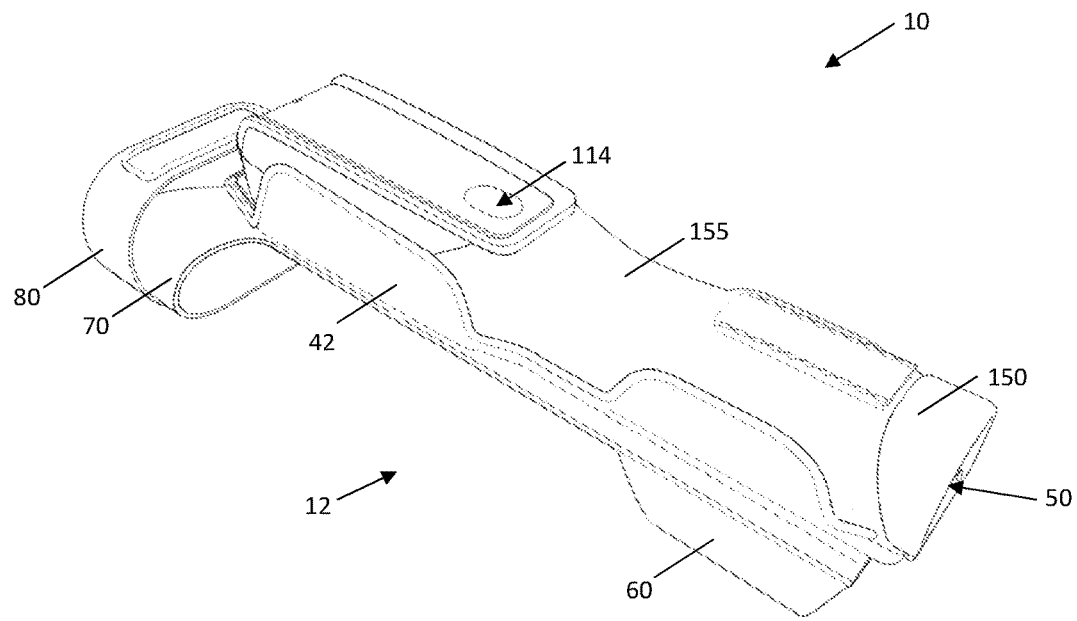
FIG. 2 is a front perspective view of one embodiment of an assembled device in accordance with the present disclosure.
Figure 3:
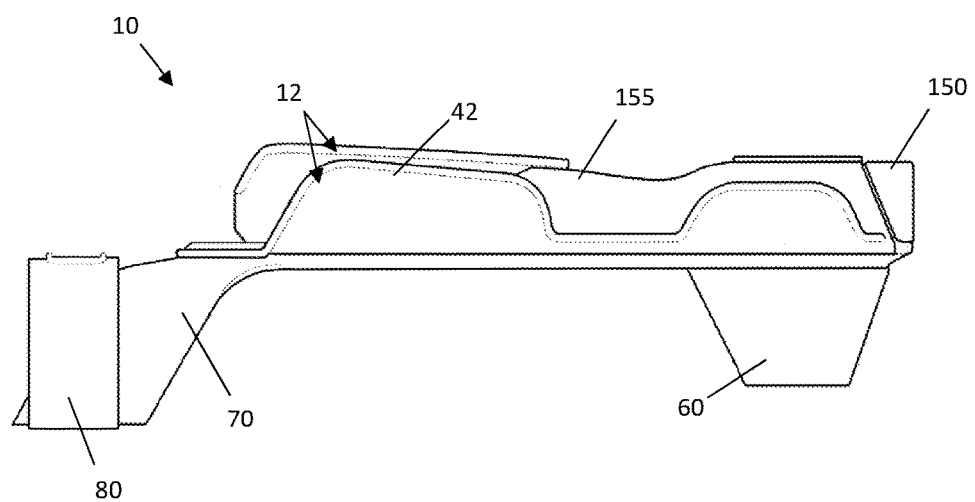
FIG. 3 is a front view of the device of FIG. 2

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

As shown in FIGS. 1 through 5, embodiments of the device 10 according to the present disclosure employ a housing 12 including an elongated base plate 15 and upper 100 and lower 40 housing assemblies. The base plate 15 can be provided as a flexible plastic platform to which components of the lower housing assembly 40 are secured. In various embodiments, the lower housing assembly 40 includes a frame member 42, a battery compartment 44 and a laser sleeve 46. The battery compartment 44 can be secured to a first end 17 of the base plate 15 and the laser sleeve 46 can be secured to a second end 19 of the base plate 15. The frame member 42 can engage both ends 17, 19 of the base plate 15 to assist in retaining the base plate 15 in position. In various embodiments, the frame member 42 is provided as an open-ended soft plastic element having first 47 and second 48 sets of opposing walls 49 along the side edges 33 thereof, with an apron member 59 at a first end 69 thereof. The apron member 59 provides sufficient end support behind the battery compartment 44 and laser sleeve 46 of the lower housing assembly 40. In various embodiments, the laser sleeve 46 is provided as a hard plastic material having a substantially semi-circular bed 55 for receiving a laser as described hereinafter.

The laser sleeve 46 can be secured to the base plate 15 in various ways, such as by glue or physical prongs which securely engage openings in the base plate, for example. The laser sleeve 46 can further include elements for securing other parts of the presently disclosed device 10. For example, the laser sleeve 46 can include outwardly extending pegs 140 on a front face 141 for engaging openings 149 in a front bezel 150 for a lens 52. The laser sleeve 46 can further include lateral extensions 130 on side walls 132 for receiving openings 125 in a front frame 104 of the upper housing component 100, as described elsewhere herein. In various embodiments, the battery compartment 44 has a battery compartment outer edge 244, the laser sleeve 46 has a laser sleeve outer edge 246, and the frame 42 is secured at the first 17 and second 19 ends of the base plate 15 and outside of the battery compartment outer edge 244 and the laser sleeve outer edge 246. In this way, the frame 42 assists in covering the battery compartment 44 and laser sleeve 46 to assist with desired operation.

As further shown in FIGS. 1 through 5, an optical projection device 50 including a laser 51, lens 52 and component board 56 is secured on or at least partially within elements of the lower housing 40. For example, a laser 51 having a substantially tubular shape rests within the laser sleeve 46 and has an adjoining lens 52 at a first end 53 for facilitating laser operation in accordance with the present disclosure. In various embodiments, the lens 52 is secured to the laser 51 by locating details and/or adhesive. At a second end 57, the laser 51 is connected to powering lines 67 that are secured to the component board 56. The component board 56 also houses a power switch 61, an LED light 66 and a charging port 58 for charging a battery 90 that rests within battery compartment 44 and is connected to the charging port 58. The battery 90 provides power to the device 10 when the power switch 61 is turned on, as will be appreciated. In various embodiments, the battery 90 and/or the bezel 150 may or may not be considered as part of the optical projection device 50.

As further shown in FIGS. 1 through 5, components of the upper housing assembly 100 are secured atop the lower housing assembly 40 and internal components 51, 52, 90 and 56 to retain the internal components in place and provide a compact structure for overall operation of the device 10. In various embodiments, the upper housing assembly 100 includes a back frame 102, a front frame 104, and a flexible upper housing member 106. The back frame 102 includes a platform 110 formed with an opening 112 for retaining a power button 114. The back frame 102 can be secured to the base plate 15, the battery compartment 44 or between the base plate 15 and the battery compartment 44 in a variety of ways. For example, legs 108 extending downwardly from the platform 110 can latch into openings in the base plate 15 or the battery compartment 44 in accordance with various embodiments of the present disclosure. The back frame 102 can also be secured to the base plate 15 so as to align the power button 114 with the power switch 61, such that a user can turn the device on and off by pushing power button 114. The front frame 104 is provided as a hood-type member with a pair of side walls 120 and a top wall 122 connecting and/or formed with the side walls 120. In various embodiments, the side walls 120 are latchable to the laser sleeve 46, such as by openings 125 formed in the side walls 120 that engage lateral extensions 130 extending outwardly on both sides of the laser sleeve 46. In various embodiments, the back frame 102 and front frame 104 are formed of hard plastic material. The flexible upper housing member 106 can be secured to the battery compartment 44 and the laser sleeve 46, for example, through appropriate openings 136 in the flexible upper housing member 106 and corresponding pins 194 extending outwardly of the battery compartment 44 and/or laser sleeve 46. As shown in FIG. 1, the flexible upper housing member 106 is secured between the back frame 102 and the front frame 104.

It will be appreciated that the flexible base plate 15 at central area 198 is aligned with the flexible upper housing member 106 to accommodate a user's finger bending during operation. For example, with the knuckle of a user's middle finger underneath the central area 198 of the flexible base plate 15, it is likely to bend the device at the central area 198 as well as at the central area 198 of the flexible upper housing member 106. In various embodiments, a controllable linear stretching motion within the components keeps the laser aligned through the centerline of the finger, compensating for the distance from the axis of the finger joint to the device location. It will also be appreciated that the optical projection device 50 is maintained at least partially within the housing, wherein the bezel 150 covering the lens 52 may extend outside of the housing 12, for example.

In various embodiments, softer cloth or similar material elements 155 can be secured under the base frame 15 and around the upper 100 and lower 40 housing assemblies. Such elements 155 provide protection to the user during operation and an overall unified appearance. The cloth elements 155 can be secured by stitching and/or by external components that secure the cloth elements 155 to one or more of the base plate 15, upper 100 or lower 40 housing assemblies, for example.

As shown in FIGS. 1 through 5, several straps 60, 70, 80 are secured to the device 10 to assist with retaining the device 10 on a user's hand and finger. For example, a finger strap 60 is secured to the first end 17 of the base plate 15, and a wrist strap 70 is secured to the second end 19 of the base plate 15. In various embodiments, multiple finger straps are provided, such as for the middle finger, ring finger and pointer finger, for example. In various other embodiments, one or more finger straps are employed, and no wrist strap is employed. In the embodiments with a wrist strap (e.g., 70), a separate adjustable strap 80 can also be secured directly to the wrist strap 70. In various embodiments, the straps 60, 70, 80 are secured by stitching, and the adjustable strap 80 can be operable using hook and loop type fasteners as will be understood. The multiple straps 60, 70 and 80 provide attachment stability when in operation, and facilitate a consistent connection such that operation of the laser 51 provides consistent feedback to the user.

In various embodiments, the straps 60 and 70 are secured to the base plate 15 prior to the frame member 42 being secured to the base plate 15, such that securing the frame member 42 provides additional stability to the secured straps 60 and 70. The frame member 42 can be provided as a hard but flexible plastic that can be formed around the base plate 15 and straps 60, 70, for example.

In operation, as illustrated in FIG. 5, a user inserts his or her shooting hand through the wrist strap 70 and inserts the middle finger of his or her shooting hand through the finger strap 60. The adjustable strap 80 can then be secured about the back 200 of the user's wrist 205. Combined with the wrist strap 70 around a forward portion 210 of the user's wrist 205 and the finger strap 60 about a user's finger 215, the adjustable strap 80 provides a secure connection between the device and the user so as to enable consistent feedback from the optical projection device 50 during operation. When the power button 114 is pushed, and assuming battery 90 is sufficiently charged, the button 61 on the board 56 is depressed to provide power and connectivity to laser 51 and the LED light 66 turns on indicating the power is on. In various embodiments, the light 66 may pulse a red color to indicate low battery, glow a red color during charging, and glow a green color when fully charged. Once turned on, the laser 51 projects a light beam or point through lens 52 in the direction 220 over the user's inserted finger (e.g., 215 in FIG. 5). As the user holds a basketball for shooting training with wrist 205 cocked back, the emitted beam or point will point backwards near horizontal past the user's head, over the ear, and as the user shoots and properly follows through with the wrist and fingers folded down, the emitted beam or point will follow the direction of the path of travel of the user's finger 215. It will be appreciated that the apron member 59 of frame 42 is provided at a sufficient raised angle to the base plate 15 so as not to interfere with a user's hand during operation. Ideally, the emitted beam or point will track through the backboard and rim of a basketball goal and towards the ground to indicate proper form has been used. Regardless, instant feedback is available to the user to know if he or she is aligned improperly or has another form-related issue to be corrected. In various embodiments, the lens 52 adapts the emitted beam so that it is presented as a straight line, wherein the user can attempt to keep the straight line as vertical as possible during training to indicate proper shooting form is being used.

It will be appreciated that the presently disclosed device works effectively regardless of whether the user is employing an actual basketball and/or training with an actual basketball goal. For instance, the user can practice proper form using the device disclosed herein at home and other environments away from a basketball court. Further, no basketball or other external device is required to operate the device disclosed herein and receive the associated training benefits.

The invention claimed is:

1. A device for improving basketball shooting form, comprising:
   a housing comprising a base plate secured against a frame, wherein the base plate comprises first and second ends, wherein the frame comprises an apron member extending at a raised angle above the first end of the base plate, wherein the housing further comprises an upper housing assembly secured around an optical projection device maintained at least partially within the housing, wherein the upper housing assembly comprises a flexible upper housing member secured between a back frame and a front frame; and
   a finger strap secured to the housing for securing to a finger of a user.

2. The device of claim 1, wherein the optical projection device is maintained at least partially within the frame.

3. The device of claim 1, wherein the base plate is secured within the frame.

4. The device of claim 1, wherein the finger strap is secured to the second end of the base plate.

5. The device of claim 1, wherein the optical projection device is configured to project a point or beam over the second end of the base plate.

6. The device of claim 1, further comprising:
   a wrist strap secured to the housing for securing to a wrist of the user; and
   an adjustable strap secured to the wrist strap for securing to a wrist of the user.

7. The device of claim 1, wherein the optical projection device comprises a laser secured to a lens.

8. The device of claim 1, wherein the base plate is formed of a flexible material.

9. A device for improving basketball shooting form, comprising:
   a housing comprising a base plate secured against a frame, wherein the base plate comprises first and second ends, wherein the frame comprises an apron member extending at a raised angle above the first end of the base plate, and wherein the frame further comprises a first set of opposing walls;
   an optical projection device maintained at least partially within the housing;
   a finger strap secured to the housing for securing to a finger of a user; and
   a laser sleeve secured at least partially within the first set of opposing walls.

10. The device of claim 9, wherein the frame comprises a second set of opposing walls, and further comprising a battery compartment secured at least partially within the second set of opposing walls.

11. The device of claim 10, wherein the first set of opposing walls of the frame is proximate the second end of the base plate, and wherein the second set of opposing walls of the frame is proximate the first end of the base plate.

12. The device of claim 10, wherein the apron member engages the battery compartment.

13. The device of claim 9, wherein the optical projection device comprises a laser maintained within the laser sleeve.

14. The device of claim 13, wherein the laser is secured to a component board maintained above the battery compartment.

15. The device of claim 14, further comprising an upper housing assembly comprising a back frame and a front frame, wherein the back frame of the upper housing assembly is secured around the component board and the front frame is secured around the laser.

16. The device of claim 15, wherein the upper housing assembly further comprises a flexible upper housing member secured between the front frame and back frame.

17. The device of claim 16, wherein the flexible upper housing member is secured to the battery compartment.

18. The device of claim 16, wherein the flexible upper housing member is secured to the laser sleeve.

19. A device for improving basketball shooting form, comprising:
   a housing comprising a base plate secured against a frame, wherein the base plate comprises first and second ends, wherein the frame comprises an apron member extending at a raised angle above the first end of the base plate;
   an optical projection device maintained at least partially within the housing;
   a finger strap secured to the housing for securing to a finger of a user; and
   a flexible upper housing member secured above the base plate.

* * * * *